United States Patent

Nomura et al.

[11] 3,979,819
[45] Sept. 14, 1976

[54] MACHINE TOOL WITH A TURRET HEAD FOR MULTIPLE SPINDLE UNITS AND AUTOMATIC TOOL CHANGING APPARATUS

[75] Inventors: Kenzi Nomura, Aichi; Yozi Kamiya, Anjo; Kengo Yoshioka, Kariya, all of Japan

[73] Assignee: Toyoda Koki Kabushiki Kaisha, Kariya, Japan

[22] Filed: July 19, 1974

[21] Appl. No.: 489,882

[30] Foreign Application Priority Data

July 28, 1973  Japan.............................. 48-85128

[52] U.S. Cl...................................... 29/568; 408/35
[51] Int. Cl.$^2$.......................................... B23Q 3/157
[58] Field of Search........................... 29/568; 408/35

[56] References Cited
UNITED STATES PATENTS

| | | | |
|---|---|---|---|
| 3,524,248 | 8/1970 | Durr et al. ............................ | 29/568 |
| 3,762,036 | 10/1973 | Goebel et al. ......................... | 29/568 |
| 3,821,844 | 7/1974 | Harman et al. ........................ | 29/568 |

FOREIGN PATENTS OR APPLICATIONS

| | | | |
|---|---|---|---|
| 1,477,429 | 1/1970 | Germany .............................. | 29/568 |

*Primary Examiner*—Othell M. Simpson
*Assistant Examiner*—Z. R. Bilinsky
*Attorney, Agent, or Firm*—Oblon, Fisher, Spivak, McClelland & Maier

[57] ABSTRACT

A machine tool having a turret head equipped with a plurality of multiple spindle units on the support stations thereof with the exception of one station rotatably supporting a tool spindle adapted to removably receive a tool, a tool storage magazine storing a plurality of "single" tools, and tool changing apparatus for interchanging the tools between the tool spindle and the tool storage magazine. The turret head may be rotated to successively position one of the multiple spindle units or the tool spindle at an operating position that confronts with the workpiece supported on the worktable such that the multiple spindle unit or the single tool on a tool spindle performs the machining operation on the workpiece. With regard to the tool changing operation for the single tool, the tool changing means may automatically interchange a tool in the tool spindle positioned at the operating position with respect to a tool presented into a changing position where it is immediately above the operating position by the rotational indexing of the tool storage magazine. Furthermore, there is provided an elevating head which mounts thereon the turret head, the tool storage magazine and the tool changing means, and also causes the tool storage magazine and the tool changing means to travel in a body relative to the workpiece such that the tool changing operation for the single tool may be initiated immediately when and where the machining operation is halted.

5 Claims, 4 Drawing Figures

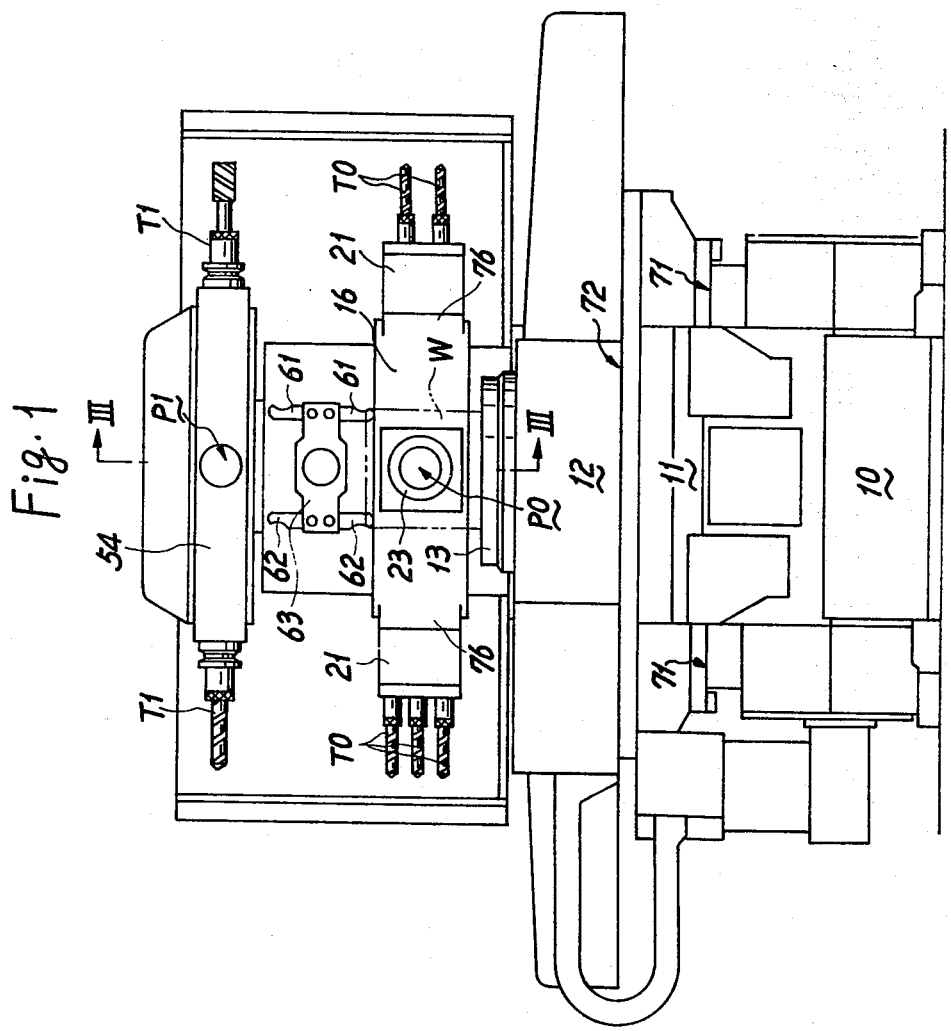

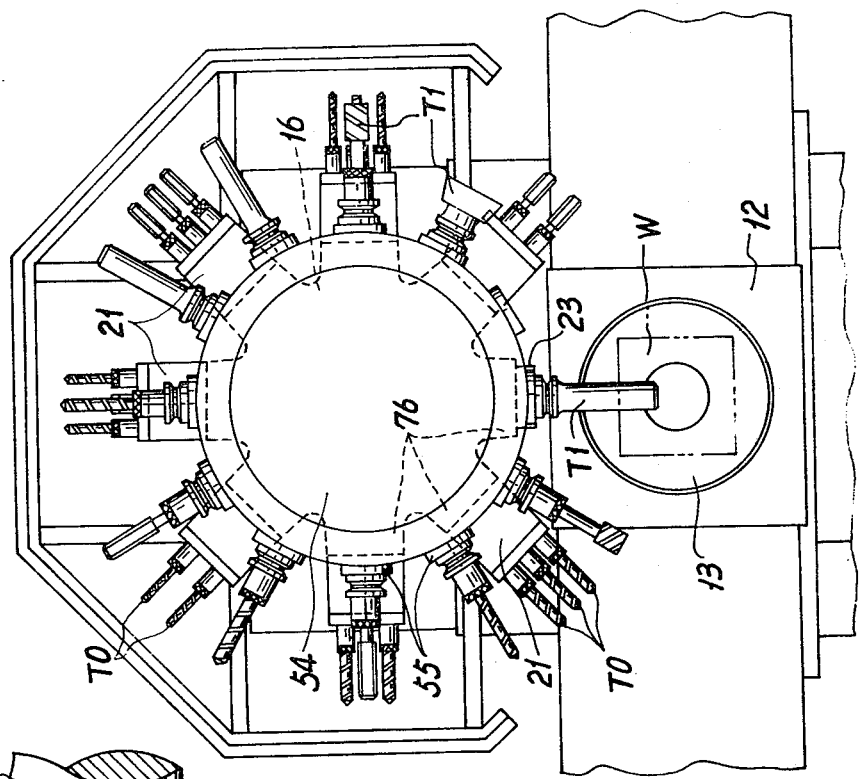
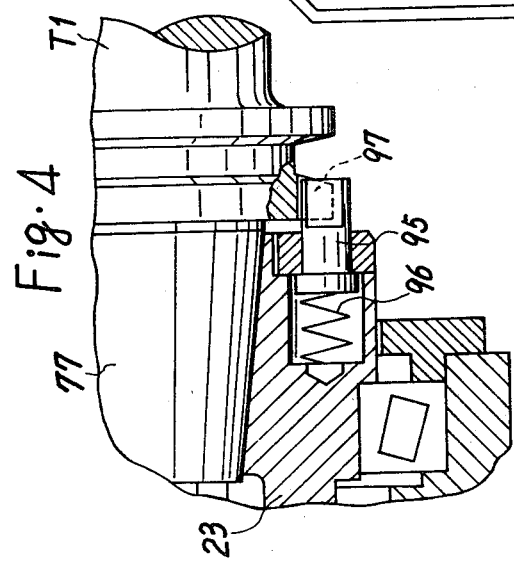

MACHINE TOOL WITH A TURRET HEAD FOR MULTIPLE SPINDLE UNITS AND AUTOMATIC TOOL CHANGING APPARATUS

BACKGROUND OF THE INVENTION

1. Field of the Invention

The present invention relates generally to a turret type machine tool having an automatic tool changing apparatus and more particularly to an improved machine tool which may successively perform special and general purpose machining operations by selectively using a multiple spindle unit and a single tool spindle unit associated with the automatic tool changing apparatus such that both high efficiency and versatility of the machining operations may be obtained.

2. Description of the Prior Art:

In a production system wherein fifty to five hundred workpieces are machined as one lot, a machine tool, known as a machining center, which is equipped with a tool spindle unit and an automatic tool changing apparatus associated therewith has been generally used to automatically machine many portions of each of the workpieces by using a conventional cutting tool, such as a drill, reamer, milling cutter, boring tool, or the like. However, in spite of the adaptability of the machine to a variety of machining operations, the machine tool is relatively restrained in increasing the machining efficiency because one tool is always effective to machine only one of many machining portions of the workpiece at a given time.

For the foregoing reason, recently there have been developed a few kinds of gang head type machining centers which, in addition to the automatic tool changing apparatus for the single tool, are also equipped with automatic gang head changing apparatus. However, in such a machine tool, the storage apparatus for storing a plurality of gang heads or multiple spindle units is completely independent of an operating position where a spindle head adapted to support selectively a gang head and a single tool performs the machining operations, and is positioned far apart therefrom. Therefore, a large capacity for storing many gang heads can be provided, but the head changing apparatus which transfers a gang head selected out of the storage apparatus into the operating position and also restores another head removed therefrom into the storage apparatus becomes complex in construction and further requires a lot of time in the head changing operation. As a result, such a machine tool system has become huge in size and is not as of yet satisfactory as to high efficiency. That is to say, the machine tool system of the prior art is available for mass-production, but is not completely suitable for a subjective production system.

SUMMARY OF THE INVENTION

It is therefore an object of the present invention to provide a new and improved gang head type machine tool which is also equipped with a tool changing apparatus for single tools, is simplified in construction, performs a more highly efficient machining operation and is optimized for a production system.

Another object of the invention is to provide a new and improved gang head type machine tool in which at least one of the gang heads and a tool spindle are brought successively into an operation position by the simple rotational indexing of a machine member supporting the gang heads and the tool spindle.

Another object of the invention is to provide a new and improved gang head type machine tools with a turret head which is equipped with a plurality of gang heads and a tool spindle associated with tool changing facilities including tool storage means and tool changing means.

A further object of the invention is to provide a new and improved gang head type machine tool wherein a support for rotatably supporting a turret head equipped with a plurality of gang heads and a tool spindle also operably supports tool changing facilities in a body such that the tool changing function for the single tools is immediately initiated when and where the machining movement of the tool spindle is halted relative to the workpiece.

A still further object of the invention is to provide a new and improved gang head machine tool wherein an annular coupling means having a relatively large diameter is arranged, around a column, between the turret head and the support, such that the turret head is firmly seated on the support during the machining operation.

Briefly, in accordance with the present invention, the foregoing and other objects are attained by a machine tool including a turret head, a tool storage magazine and a tool changing means. The turret head is formed with a plurality of tool support stations on the periphery thereof and is rotated about a vertical axis by index means to position one of the stations at an operating position that confronts the workpiece supported on the worktable. A plurality of gang heads are attached respectively on the tool support stations with the exception of one tool support station on which a tool spindle is rotatably supported for removably supporting a tool. Therefore, one head selected out of the gang heads of the spindle is brought quickly into the operating position by the simple index operation of the turret head, whereby the head changing operation may be accomplished within a short term without adopting a complex head changing facility. Furthermore, the machine tool includes an elevating head which is vertically moved relative to the workpiece. On the elevating head, the turret head and the tool storage magazine are mounted to be rotated about a common vertical axis in a manner of tandem array. As the turret head is rotated to bring one of the heads or a tool spindle into the operating position, the magazine is also rotated to bring one of the tools stored therein to a changing position that is immediately above the operating position. Similarly, on the elevating head, tool changing means is operably mounted to change between a tool on the tool spindle positioned at the operating position and a tool indexed into the changing position on the magazine. In accordance with such construction, because the operating position, the changing position and the changing means may always be moved in a body relative to the workpiece, the tool changing function may be accomplished immediately when and where the machining operation is halted, whereby the tool changing time may be substantially reduced. Moreover, the above construction leads to many advantages such as, a compact machine tool system, excellent operational maintenance, high efficiency and versatility in operations.

Still further, the turret head is rotatably supported on the column which is fixed on the elevating head. To seat the turret head disengagably on the elevating head, an annular coupling means which includes a pair of relatively large diameter ring members is arranged between the turret and elevating heads. The ring members are formed with a circular array of gear teeth on the respective confrontation side. In the machining operation, the coupling means securely seats the turret head on the elevating head, whereby the machining accuracy may be guaranteed.

BRIEF DESCRIPTION OF THE DRAWINGS

Other objects and features of the invention will become apparent to those skilled in the art as the disclosure is made in the following description of a preferred embodiment of the invention, as illustrated in the accompanying sheets of drawings, in which:

FIG. 1 shows an elevation of a preferred embodiment of the invention;

FIG. 2 illustrates a plan view of the apparatus shown in FIG. 1;

FIG. 4 illustrates an enlarged sectional view of a front portion of a tool spindle shown in FIG. 3.

DETAILED DESCRIPTION OF THE PREFERRED EMBODIMENT

Figure 3:
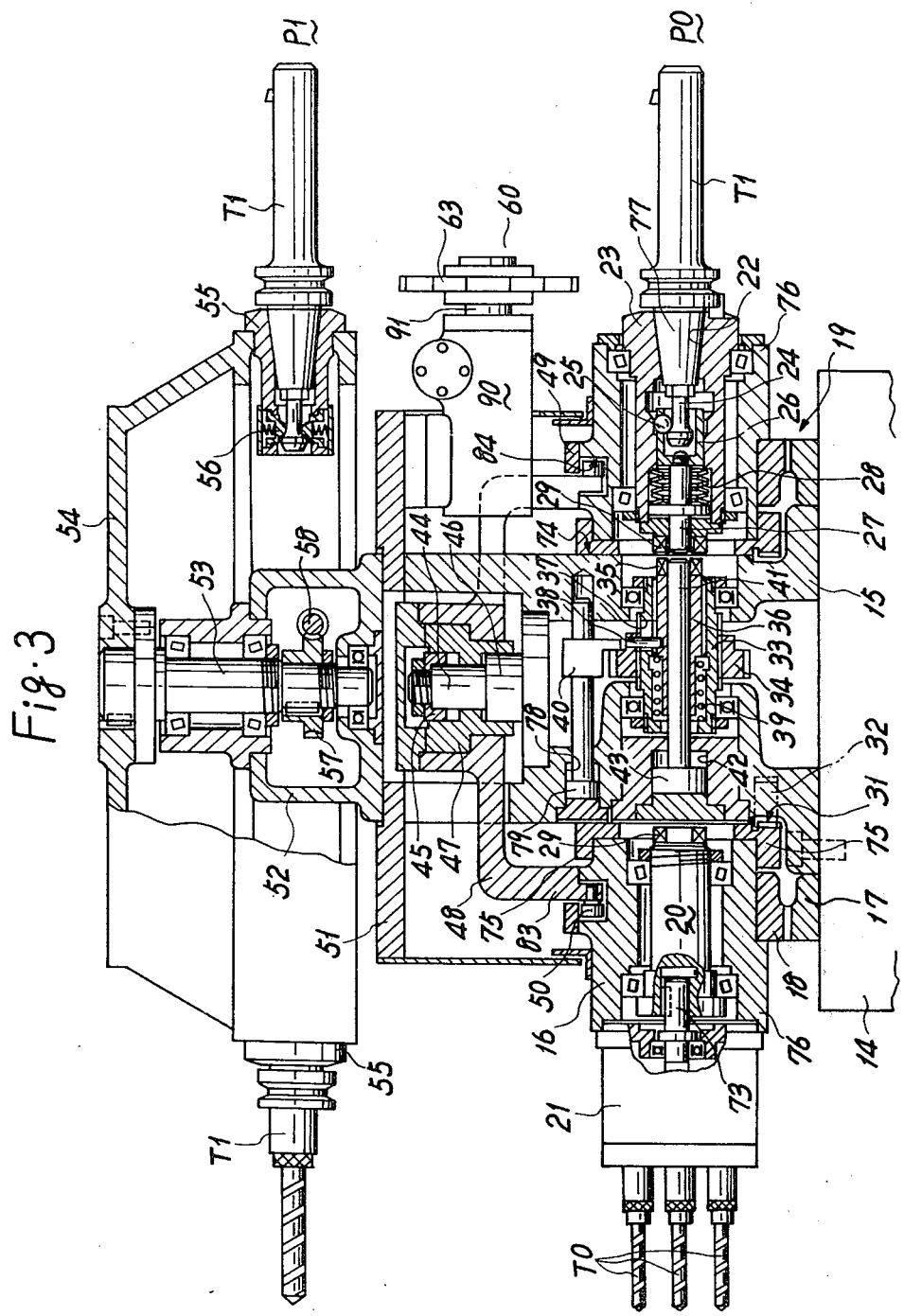
FIG. 3 shows an enlarged section of the apparatus taken along the line III—III of FIG. 1 looking in the direction of the arrows.

Referring now to the drawings, and more specifically to FIG. 1 and FIG. 2 thereof, a so-called machining center incorporating the features of the present invention is shown in elevation and plan view. As illustrated, a saddle 11 is slidably mounted on longitudinal guide ways 71 provided on a machine tool base 10. A table 12 is slidably mounted on transverse guide ways 72 which are provided on the saddle 11 and extend at a right angle with respect to the longitudinal guide ways 71. To move the saddle 11 and the table 12 along respective guide ways 71, 72, it is to be noted that they are equipped with conventional driving mechanisms (not shown), each including, for example, screw-nut means, a reduction gearing unit and a numerically controlled stepping motor. Mounted on the table 12 is a rotatable worktable 13 on which one or more workpieces W can be detachably mounted by conventional means. The worktable 13 is adapted to effect rotary movement thereof about a vertical axis by means of a suitable indexing mechanism (not shown) which can index the same into several predetermined angular positions or by means of a numerically controlled index unit for successively indexing the same into any desired angular positions. Therefore, the workpiece W, on the worktable 13, effects the coordinate movement in a horizontal plane with respect to a machining position or operating position P0, and confronts to the operating position P0 at a desired angle about the vertical axis.

Referring now to FIG. 3, provided on the base 10 are vertical guide ways (not shown) along which a vertical slide member or elevating head 14 is slidably guided. The elevating head 14 may be moved upwardly and downwardly by a driving mechanism which is similar to that of the saddle 11 or table 12. A cylindrical center column 15, having an annular bearing surface 74 on its circumference, is fixedly mounted on the elevating head 14. A turret head 16 is guided, through a pair of annular sleeves 75, 75 fixed to the head 16, by the surface 74 such that the head 16 may be indexed and moved in a vertical direction with respect to the column 15. For removably and firmly seating the turret head 16 on the elevating head 14, fixed on the lower surface of the turret head 16 is an annular toothed member 18 which can be removably engaged with another similar member 17 fixed on the elevating head 14. These members 18 and 17 are both concentric with the cylindrical column 15 and are both surrounding the same. Members 18 and 17 are formed with a pair of circular arrays of gear teeth in a complementary relationship on the confrontation side therebetween, and constitute a coupling set 19.

A plurality of spindles 20 are arranged radially of the turret head 16 in equiangular relationship with each other. A plurality of gang heads, or multiple spindle heads 21 are respectively attached to the predetermined projections or tool support stations 76 (see FIG. 2) which are on the turret head 16. With regard to the explanation of the gang head 21 shown in FIG. 3 which is almost similar with the other in configuration, an input shaft 73 is mechanically connected to the multiple tools T0 in the head 21 and is rotatably supported at the rear end of the head 21. The input shaft 73 is also connected to the associated spindle 20 such that the multiple tools T0 are simultaneously rotated by driving the spindle 20. However, at least one spindle, denoted as 23, constitutes a single tool spindle which is formed with a tapered bore 22 for removably supporting a tapered shank 77 of a single tool, such as a boring tool T1. It is preferred that two or more single tool spindles are provided on the periphery of the turret head 16 in order to reduce the exchange time of the single tool T1. However, in the event that the turret head 16 is limited in size, it is preferable to provide only one single tool spindle as well as the illustrated embodiment of the present invention such as to increase the number of gang heads 21 attached to the turret head 16.

Provided within the single tool spindle 23 is a tool clamp mechanism which comprises a retainer 26, a drawing rod 27 and a bevelled spring assembly 28. The retainer 26, retaining one or more steel balls, 25, is selectively slidable, and makes the ball 25 engage with the drawing bolt 24 of each single tool T1 at its retract position, whereby the tapered shank of each tool T1 is assuredly seated on the tapered bore 22. The drawing rod 27, secured to the retainer 26 on its forward end, is always pressed into the rear to clamp the tool T1 and is forwardly advanced to release the tool when the rod 27 is pushed against the spring assembly 28 by means of a cylinder unit which will be hereinafter described. Furthermore, each rear end of the spindles 20 and 23 is provided with a driven means 29, such as a pair of driven recesses, which are selectively engaged with respect to a pair of drive keys 35, also described hereinafter. To index either one of the tools selected out of the gang head 21 or the spindle 23 into the operating position P0, the sleeve 75 is formed with an internal gear 31 concentric therewith. The gear 31 is always engaged with a spur gear 32, an input shaft of which is rotated by a head drive motor (not shown), such as an electric motor and fluid motor. Accordingly, when the motor carries out a predetermined operation, one gang head selected out of the gang heads 21 or the single tool spindle 23 is selectively brought into the operating position P0 through the simple rotary movement of the turret head 16. Of course, it will be apparent that such indexing operation of the head 16 is performed under a condition that the head 16 is being lifted to disengage coupling members 17 and 18 from each other.

A selectively operable power transmitting apparatus is positioned within the center column 15 to supply the driving power to the spindle positioned at the operating position P0. A rotatable sleeve 33 of the transmitting apparatus is supported by a pair of anti-friction bearings in axial alignment with the spindle positioned at the operating position P0. Slidably engaged with the periphery of the rotatable sleeve 33, in a splined connection, is a drive spur gear 34 which is driven by a suitable motor (not shown), for example, a direct current motor. A clutch member 36, having the pair of keys 35 at the forward end thereof, is slidably inserted into the rotatable sleeve 33 in a splined connection with the internal surface of the rotatable sleeve 33. A compression coil spring 39, provided within the rotatable sleeve 33, always urges the clutch member 35 so as to engage the keys 35 with the driven members 29. To retract the clutch member 36 against the spring force, a pin 38 is provided through a cutout 37 which cutout is axially extended on the rotatable sleeve 33. A lever 40 is secured on a piston-rod projected from a fluid cylinder 78 which slidably contains a piston 79 movable in parallel with the clutch member 36, and engages with a front face of the drive gear 34. Therefore, when the fluid cylinder 78 is rearwardly operated, the clutch member 35 is retracted together with drive gear 34 by the lever 40 against the coil spring 39. As a result, the drive keys 35 become disengaged from the pair of driven members 29, as illustrated. On the other hand, when the fluid cylinder 78 is forwardly operated, the clutch member 36 is advanced toward the driven member 29 by the assistance of the spring 39. However, the drive keys 35 are not always engaged with the driven members 29 correctly. For this reason, the clutch members 36 is slowly rotated by the drive motor thereof as the clutch member 36 is advanced. Accordingly, it will be apparent that, within at least one revolution of the clutch member 36 after the drive keys 35 thereof are pushed and come into contact with the driven members 29, the clutch member 36 will correctly transmit the rotating power to the spindle 20 or 23 selectively positioned at the operating position P0. The center column 15 has a fluid cylinder 42 which contains a piston 43 slidable on the axis axially aligned with the single tool spindle 23 positioned at the operating position P0. A push rod 41 which projects from a front face of the piston 43 penetrates through the clutch member 36, and confronts a forward end thereof with the rear end of the drawing rod 27. Therefore, when the cylinder 42 is operated to forwardly move the piston 43, the push rod 41 forwardly moves the drawing rod 27 and retainer 26 against the spring force, whereby the single tool T1 can be released from the single tool spindle 23 positioned at the operating position P0.

For enabling the index movement of the turret head 16, a vertical support shaft 44, which constitutes a lifting mechanism of the turret head 16, is provided on the center column 15 concentrically therewith. The support shaft 44 is provided with a pair of vertically spaced pistons 45 and 46, and is provided with a slender rod at the middle thereof. The slender rod slidably penetrates through the partition wall of the cylinder 47 which slidably contains the pair of pistons 45 and 46 within the upper and lower fluid chambers thereof. A hanger bracket or support bracket 48, which is formed with skirt portions 83 on the periphery thereof, is mounted on the cylinder 47 movable in only a vertical direction. A plurality of rollers 50 are rotatably disposed on peripheries of the skirt portions 83 and are arranged within an annular recess 84 which is formed on the top surface of the turret head 16. An annular plate 49, for forming the annular recess 84, is fixed on the turret head 16. Therefore, when the fluid under pressure is exerted in the lower chamber of the cylinder 47, the support bracket 48 is lifted together with the turret head 16 by the engagement between a plurality of rollers 50 and the annular plate 49. Therefore, the turret head 16 is released from a previously fixed position thereof because the upper toothed member 18 is disengaged from the lower one 17. In this condition, accordingly, the turret head 16 can be indexed to the next desired angular position by the controlled rotary movement of the spur gear 32. On the other hand, when the fluid pressure is exerted in the upper chamber, the support bracket 48 is lowered together with the turret head 16 and, then, brings the latter to be firmly seated on the elevating head 14 through the accurate engagement of the coupling 19.

Fixedly mounted on the center column 15 is a support plate 51 to which a tool storage apparatus and a tool interchange mechanism are attached, such that the tool changing function is automatically performed between the tool storage apparatus and the single tool spindle 23 positioned at operating position P0. A rotary shaft 53, rotatable about a vertical axis, is supported on a housing 52 mounted on the support plate 51. Secured to the rotary shaft 53 is a drum-shaped tool magazine 54, on the periphery of which a plurality of tool holding sockets 55 are provided in an equiangular relationship with one another. Each of the tool holding sockets 55 is formed with a tapered bore, which radially opens in parallel with the single tool spindle 23, into which a plurality of single tools T1 are inserted in order of use. To avoid the running out of the single tool T1 from the socket 55 by effecting the index movement of the tool magazine 54, the drawing bolt 24 of the single tool T1 is removably retained within the tool sockets 55 by a pair of spring-biased plunger means 56 which is positioned inside of the tapered bore of the tool socket 55. Fixed on the rotary shaft 53 is a worm wheel 57 which is engaged with a worm shaft 58 connected to a drive motor (not shown). The drive motor is, at each time when the same is energized, always controlled to move the tool magazine by one pitch equivalent to the angular distance between a previously used single tool T1 and the next tool T1 both stored on the tool magazine 54. Therefore, it will be apparent that, by intermittently operating the drive motor, each of the single tools T1 on the tool magazine 54 is sequentially positioned into a tool changing position P1 located immediately above the operating position P0.

A body assembly 90 of the tool changing apparatus 60 is mounted on the support plate 51 between the operating position P0 and the tool changing position P1. A tool changing arm 63 is secured on the front end of a support shaft 91 which is movably supported on the body assembly 90 to perform the extending movement in parallel with the single tool spindle 23 and also to perform the rotating movement at the extended and retracted positions. Constituted within the body assembly 90 is a power drive means (not shown) which can selectively move the support shaft 91 for the extending and rotating movements. Pairs of grip means 61, 62 (see FIG. 1) for simultaneously grasping two single tools T1 at each of the positions P0, P1 are operably equipped on the opposite ends of the changing arm 63 and are connected to a grip actuating means (not shown) held within the body assembly 90 in a well-known manner. Therefore, it will be apparent that by a series of sequential operations comprising the gripping action, the rotary movement and the axial movement of the tool changing arm 63, a new single tool T1 at the changing position P1 is replaced with a used single tool T1 at the operation position P0. A movable drive key 95 (FIG. 4) is provided on the single tool spindle 23 to selectively bring out the firm connection between the single tool spindle 23 and the particular single tool T1, such as a boring tool and face milling tool, if it is demanded in the tool changing operation. The movable drive key 95 is slidably supported in parallel with the single tool spindle 23 thereon and is forwardly biased by the compression coil spring 96 such that the drive key 95 can be retracted when axial rearward force is exerted on the same. Therefore, in the case that the drive key 95 has to be firmly connected with a key way 97 of a particular single tool T1 in inserting the same by the changing arm 63, it is necessary that the single tool spindle 23 be slowly rotated through at least one revolution. Such revolution of the single tool spindle 23 brings about the situation that the drive key 95 of the single spindle 23 is aligned with the key way 97 of the particular single tool T1 immovably held by the tool changing arm 63, and in this manner the drive key 95 biased by the spring 96 is engaged into the key way 97.

It will be understood that it is necessary to briefly describe the entire tool changing operating in connection with the individual operations or each of the functional devices which have been already explained fully. Assuming that every operable member of a machining center of the present invention is in a starting condition as illustrated, if a gang head changing command is given, the pressurized fluid from a source (not shown) thereof is conducted into the lower chamber of the lifting cylinder 47. Therefore, the support bracket 48, integral with the cylinder 47, lifts up the turret head 16, whereby the upper toothed member 18 fixed on the turret head 16 is disengaged from the lower toothed member 17 fixed on the elevating head 14. At the next stage, the spur gear 32, which always engages with the internal gear 31, is rotated through a required amount by the drive motor (not shown) thereof. Accordingly, the desired one of the heads 21 (except the head 21 for the single tool spindle 23 in this explanation) is positioned at the operating position P0 through the controlled index movement of the turret head 16. Upon completion of the index movement, the fluid under pressure is conducted into the upper chamber of the cylinder 47. Therefore, the turret head 15 is firmly seated on the elevating head 14 through engagement of the coupling 19.

The fluid cylinder 78 is thereafter forwardly operated so as to permit advance of the drive gear 34 and clutch member 36 by coil spring 39, and the drive keys 35 then contact with the driven means 29 of the spindle 20 which is connected to the selected gang head 21. At this time, the spindle drive motor (not shown) is slowly rotated at the predetermined slow speed while the clutch member 36 is rotated through at least one revolution. Such rotation of the clutch member 35 provides that the drive keys 35 align with the driven means 29. At this time, the former is correctly engaged with the latter by aid of the spring 39. When the engagement between the drive and driven means 35, 29 is completed, the spindle drive motor is rotated at a high speed which is determined depending upon the kinds of tools, workpieces, etc. At the termination of such gang head changing operation, a series of machining operations are sequentially performed and are accompanied with the controlled vertical movement of the elevating head 14, the controlled coordinated movement of the saddle 11 and table 12 and the controlled rotary movement of the worktable 13.

The single tool changing operation is now described. In the condition that every movable member is at its starting position, as illustrated in the drawings, if a single tool changing command is given, the tool changing arm 63 is at first rotated through 90 degrees into a vertical angular position from a horizontal angular position (FIG. 1) wherein the tool changing arm 63 was at rest. Pairs of grip means 61, 62, equipped on the opposite ends of the arm 63, are next simultaneously operated to grasp two new and previously used tools T1, T1 which are being held at the tool changing position P1 and the operation position P0. Thereafter, the releasing cylinder 42 is operated so as to move the piston 43 forwardly. Therefore, the push rod 41 pushes the drawing rod 27 against the force of the bevelled spring assembly 28, and the drawing bolt 24 of the previously used tool T1 is released from the ball 25 operably held on the retainer 26. Accordingly, two new and used tools T1, T1 can be removed from each of the support members, or the tool support socket 55 and single tool spindle 23 when the tool changing arm 63 is forwardly advanced. The arm 63 is, thereafter, rotated through 180 degrees at the advanced position thereof in order to mutually replace new and used tools T1, T1 with each other. Furthermore, the arm 63 is retracted from the advanced position, whereby the used tool T1 is inserted into the socket 55, located at the position P1 and the new tool T1 is at the same time inserted into the spindle 23 which is located at the position P0. At this time, if the new tool T1 is a tool of the kind that is required to be firmly connected through the key way 97 thereof and the drive key 95 of the spindle 23, the arm 63 maintains the grasp of the grips 61, 62 for a period of time. During this period, the spindle 23, which has already been engaged with the clutch member 35, is rotated through at least one revolution. Accordingly, the drive key 95, depressed by a flange of the new tool T1, can be correctly engaged with the key way 97 of the latter.

After such operation, the releasing cylinder 42 is rearwardly operated so as to move the push rod 41 away from the drawing rod 27. The ball 25 firmly locks the drawing bolt 24 of the new tool T1 as the drawing rod 27 is rearwardly moved together with the retainer 26 by bevelled spring assembly 28. Thereafter, the grip means 61, 62 of the arm 63 are operated to release the two tools grasped thereby and the arm 63 is then rotationally brought back into the rest position thereof, whereby one cycle of the single tool changing operation is completed.

Because the magazine 54 brings the tool sockets 55, one by one, into the changing position P1 in a predetermined sequential order and the used tool, transferred from the operating position P0, is restored into the tool socket in which the new tool had been previously stored, it will be apparent that all addresses of the storage sockets on the magazine 54 have to be renewed after performing one revolution of the magazine 54 by a suitable address renewing means, such as an electrical registration circuit, mechanical registration apparatus, or the like.

Although certain specific embodiments of the invention have been shown and described, it is obvious that many modifications thereof are possible. The invention, therefore, is not to be restricted except insofar as is necessitated by the prior art and by the spirit of the appended claims.

What is claimed as new and desired to be secured by Letters Patent of the United States is:

1. A machine tool comprising:
    a slide member slidable relative to a workpiece;
    a turret head rotatably mounted upon said slide member and radially provided with a plurality of tool support stations on the periphery thereof;
    index means for selectively rotating said turret head to index one of said tool support stations into an operating position confronting the workpiece;
    a single tool spindle radially supported on at least one of said tool support stations and adapted to removably support a single tool;
    a plurality of multiple spindle units attached on said tool support stations with the exception of said at least one tool support station, each of said spindle units having plural tool spindles for simultaneously machining plural portions of said workpiece and in input shaft for simultaneously rotating said plural tool spindles;
    spindle drive means for rotating one of said single tool spindle and said input shaft of said multiple spindle unit selectively positioned at said operation position;
    tool storage magazine means disposed above said turret head for removably storing a plurality of single tools and being indexably mounted for selectively presenting one of said single tools to a changing position disposed in parallel with said single tool disposed at said at least one of said stations;
    tool changing means for interchanging two of said single tools between said tool changing position and said operating position including two tool grippers for simultaneously exchanging a single tool supported on said at least one station and positioned at said operating station with a tool of said magazine means presented to said changing position;
    an upstanding column mounted upon said slide member and upon which said tool storage magazine means and said tool changing means are mounted, and about which said turret head is indexable;
    annular coupling members fixed respectively to said turret head and said slide member in co-axial alignment with said upstanding column, with circular arrays of gear teeth engageable with each other;
    an annular flange provided on the upper surface of said turret head in co-axial alignment with said upstanding column;
    hanger bracket means shiftable in the vertical direction and engageable with said annular flange above said annular coupling members for facilitating raising and lowering of said turret head independently of said magazine means; and
    power actuator means provided upon said upstanding column and connected with said hanger bracket for shifting said turret head in said vertical direction so as to selectively connect and disconnect said turret head with and from said slide member through said annular coupling members.

2. A machine tool according to claim 1, further comprising:
    vertically extended guide openings provided upon said upstanding column for guiding said hanger bracket in said vertical direction; and
    antifriction means interposed between said annular flange and said hanger bracket means for permitting smooth relative movement therebetween in the rotational direction of said turret head.

3. A machine tool according to claim 2, further comprising:
    tool spindles, each having driven means at the rear end thereof, respectively supported upon said tool support stations so as to be rotatable about respective horizontal axes, one of said tool spindles supported on said at least one station also being provided with clamp means for clamping a tool received therein;
    a clutch member supported upon said upstanding column so as to be rotatable about and slidable along the axis of said one of said tool spindles positioned at said operation position and having drive means engageable with said spindle drive means;
    shift means for sliding said clutch means so as to engage said drive means with said drive means of any one of said tool spindles positioned at said operation position; and
    an unclamping actuator means having a push rod movable within said clutch member for pushing said clamp means of one of said tool spindles positioned at said operation position so as to thereby permit removal of a tool from one of said tool spindles.

4. A machine tool according to claim 3, further comprising:
    a rotatable sleeve journalled upon said column for receiving driving power to be transmitted to any one of said tool spindles; and
    said clutch member is slidably inserted within said rotatable sleeve with a splined connection with the same.

5. A machine tool according to claim 4, further comprising:
    a ring member shiftable by said shift means and engageable at the inner surface thereof with the outer surface of said rotatable sleeve, said ring member also being connected with said clutch member by means of a pin movable within an axial slot which is formed upon said rotatable sleeve axially of the same.

* * * * *